(12) United States Patent
Jones

(10) Patent No.: US 10,556,781 B2
(45) Date of Patent: Feb. 11, 2020

(54) PULLEY ASSEMBLY

(71) Applicant: J. C. Bamford Excavators Limited, Uttoxeter, Staffordshire (GB)

(72) Inventor: Andrew Mark Jones, Uttoxeter (GB)

(73) Assignee: J. C. Bamford Excavators Limited, Uttoxeter, Staffordshire (GB)

( * ) Notice: Subject to any disclaimer, the term of this patent is extended or adjusted under 35 U.S.C. 154(b) by 0 days.

(21) Appl. No.: 15/698,480

(22) Filed: Sep. 7, 2017

(65) Prior Publication Data
US 2018/0072545 A1  Mar. 15, 2018

(30) Foreign Application Priority Data
Sep. 9, 2016 (GB) .................................. 1615361.1

(51) Int. Cl.
| | | |
|---|---|---|
| *B66F 9/06* | (2006.01) | |
| *B66F 9/065* | (2006.01) | |
| *F16H 57/02* | (2012.01) | |

(52) U.S. Cl.
CPC ........... *B66F 9/0655* (2013.01); *F16H 57/02* (2013.01); *F16H 2057/02021* (2013.01)

(58) Field of Classification Search
CPC ............. F16H 7/12; B66F 11/04; B66C 23/70
USPC ........................ 414/718; 242/420.2; 305/154
See application file for complete search history.

(56) References Cited

U.S. PATENT DOCUMENTS

| 4,468,166 A | * | 8/1984 | Jameson | ................. | E21B 43/26 141/231 |
| 6,761,236 B2 | * | 7/2004 | Hibbert | ................. | B62D 55/14 180/9.52 |

FOREIGN PATENT DOCUMENTS

| CN | 103453092 A | 12/2013 |
| GB | 424504 A | 2/1935 |
| JP | 2006103941 A | 4/2006 |
| WO | WO-2010/122212 A1 | 10/2010 |

OTHER PUBLICATIONS

Search Report for GB 1615361.1, dated Feb. 14, 2017.
Extended European Search Report for European Patent Application No. 17189100.5, dated Feb. 2, 2018.

* cited by examiner

*Primary Examiner* — Ronald P Jarrett
(74) *Attorney, Agent, or Firm* — Marshall, Gerstein & Borun LLP

(57) ABSTRACT

A boom assembly including a boom defining a longitudinal direction pulley rotatably mounted on a pivot pin, the pivot pin having a first end with a first outer surface and a second end with a second outer surface, a pulley frame having a first part for receiving the first outer surface, a second part for receiving the second outer surface, a first hole for receiving a first adjustment rod and a second hole for receiving a second adjustment rod, the boom including a first receiving portion for receiving the first adjustment rod and a second receiving portion for receiving the second adjustment rod, the boom assembly being configured such that adjustment of the first and second adjustment rods causes movement of the pulley in the longitudinal direction.

15 Claims, 3 Drawing Sheets

PULLEY ASSEMBLY

FIELD OF THE INVENTION

The present invention relates to a pulley assembly, in particular for adjusting a chain of a telescopic boom.

BACKGROUND OF THE INVENTION

Telescopic booms are known in which a pulley is rotatably mounted on a pivot pin and engages a boom extension chain. The pivot pin has ends which project beyond the pulley and are diametrically threaded and received threaded portion of adjustment bolts. In order to adjust the chain following wear so as to resynchronize the relative positions of the first, second and third booms of the telescopic boom, the bolts are tightened thereby drawing the pulley pivot pin longitudinally relative to the boom, and hence moving the pulley longitudinally relative to the boom from a first fixed position (the non-synchronized position) to a second fixed position (the synchronized position).

However, since the bolts are threaded into a threaded hole in the pivot pin, then the pivot pin must be of a diameter sufficiently larger than the diameter of the bolts in order to ensure the threaded hole in the pin is sufficiently strong to withstand the loads applied to it during use. This requires a relatively large diameter pin, which in turn requires a relatively large diameter pulley. As the pulley diameter increases then the visibility of the load at the end of the boom as viewed by the machine operator may become impaired.

SUMMARY OF THE INVENTION

An object of the present invention is to provide a compact pulley such that operator visibility of a load is not significantly impaired.

Thus, according to the present invention that is provided a boom assembly including a boom defining a longitudinal direction, a pulley rotatably mounted on a pivot pin, the pivot pin having a first end with a first outer surface and a second end with a second outer surface, a pulley frame having a first part for receiving the first outer surface, a second part for receiving the second outer surface, a first hole for receiving a first adjustment rod and a second hole for receiving a second adjustment rod, the boom including a first receiving hole for receiving the first adjustment rod and a second receiving hole for receiving the second adjustment rod, the boom assembly being configured such that adjustment of the first and second adjustment rods causes movement of the pulley in the longitudinal direction, from a first position to a second position, the first position being a fixed position relative to the boom assembly and the second position being a fixed position relative to the boom assembly.

Accordingly the adjustment rod (for example bolts) do not directly engage the pivot pin, rather they engage the pulley frame. It is the pulley frame that engages the pivot pin. Thus the design of the engagement between the pulley frame and the pivot pin is independent of the design of the engagement between the adjustment rods and the pulley frame, and hence the size of the pivot pin is independent of the size of the adjustment rods.

BRIEF DESCRIPTION OF THE DRAWINGS

The invention will now be described, by way of example only, with reference to the accompanying drawings in which:—

DETAILED DESCRIPTION OF THE INVENTION

Figure 1:
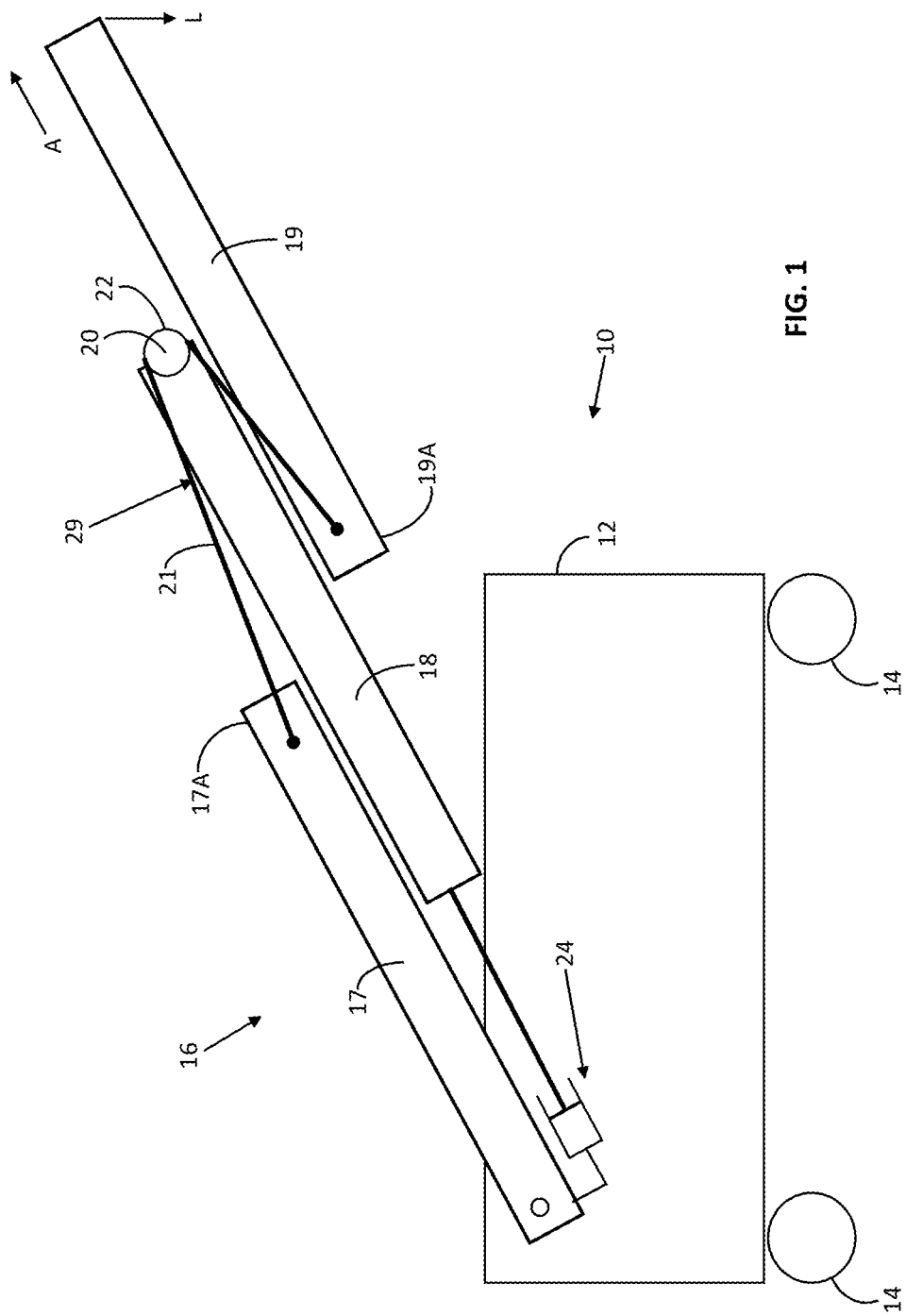
FIG. 1 is a schematic view of a load handling machine including a boom assembly and a boom arrangement according the present invention.

FIG. 1 shows a highly schematic view of a load handling machine 10, such as a telehandler. The load handling machine has a chassis 12 and ground engaging wheels 14. Pivotably mounted on the chassis 12 is a telescopic boom arrangement 16 having a first boom 17, and second boom 18 and third boom 19. A pulley assembly 20 mounted on an end of the second boom thereby defining a boom assembly 29. A chain 21 (also known as a flexible tension member) is connected to end 17a of the first boom and end 19a of the third boom. The chain 21 runs over a pulley 22 of the pulley assembly 20.

The first boom, second boom and third boom can slide relative to each other in a manner known in the art. A hydraulic ram 24 has one end attached to the first boom and one end attached to the second boom.

Extension of the hydraulic ram 24 causes the second boom to extend relative to the first boom 17. Because the chain 21 is connected to the first boom and the third boom and runs over (or at least partially wraps around) the pulley 22 mounted on the second boom, then as the second boom 18 extends relative to the first boom 17, then so the third boom 19 extends relative to the second boom 18 by virtue of the chain and pulley operating to move the third boom relative to the second boom. Thus any load L can be maneuvered by extending and retracting the telescopic boom 16 in an appropriate manner.

Figure 2:
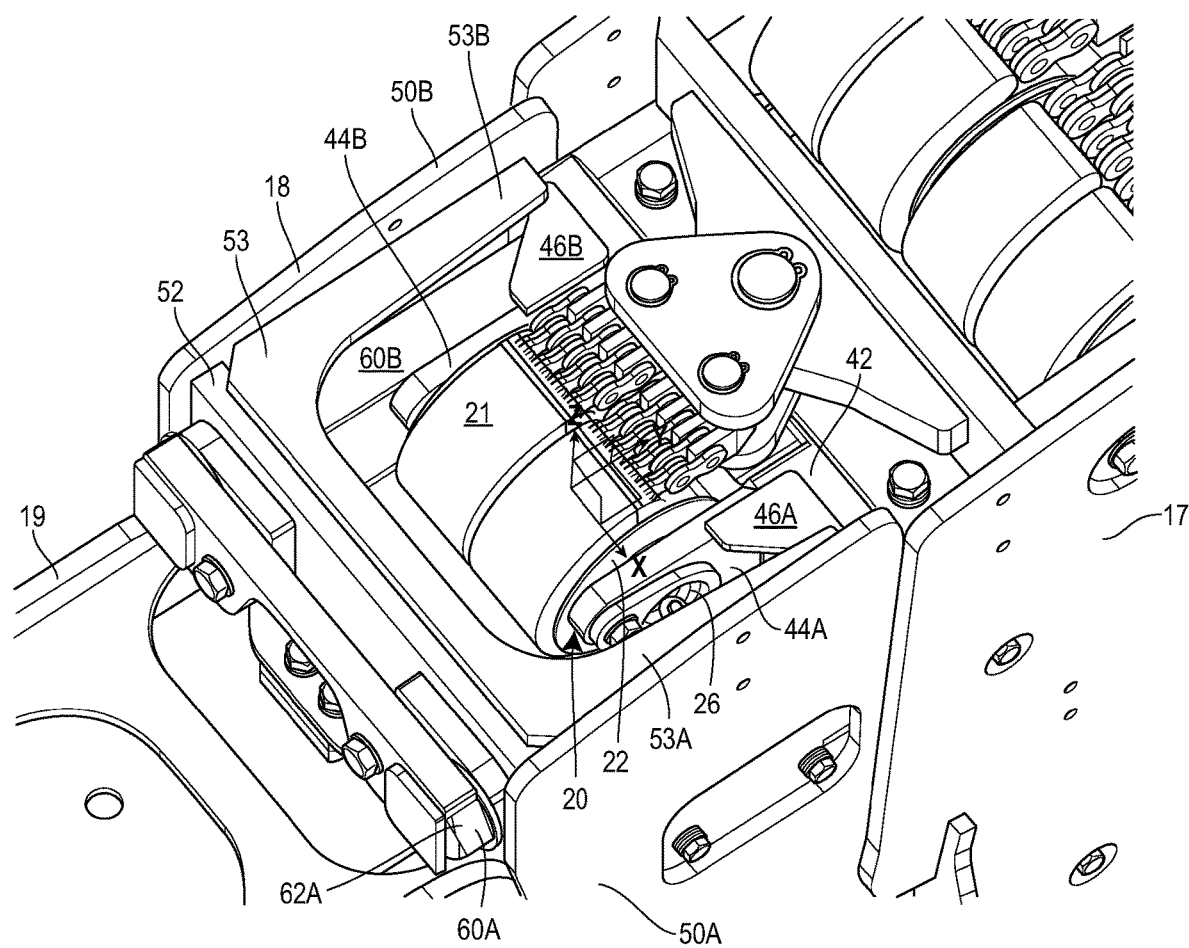
FIG. 2 is an isometric view of part of FIG. 1.
Figure 3:
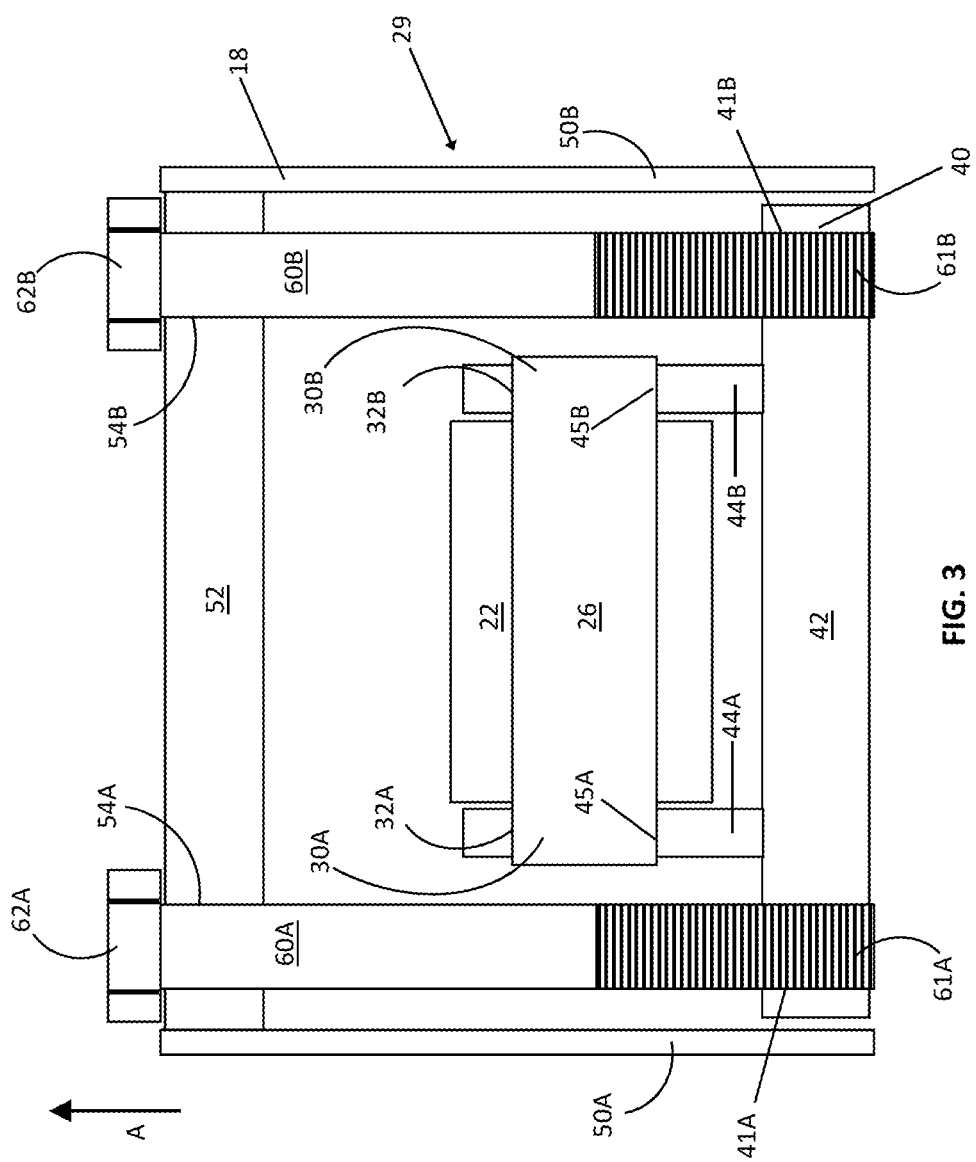
FIG. 3 is a cross section view of part of FIG. 2.

As shown in FIGS. 2 and 3, the pulley 22 is shown in more detail. The pulley 22 is rotatably mounted on a pivot pin 26. The pivot pin has a first end 30A and a second end 30B. End 30A has an outer surface 32A and end 30B has an outer surface 32B. In this example the outer surfaces 32A and 32B are cylindrical.

A pulley frame 40 includes a cross member (or transverse member) 42, a first pin support 44A and second pin support 44B. Pin support 44A includes a circular hole 45A for receiving outer surface 32A. Pin support 44B includes a circular hole 45B for receiving outer surface 32B. The pin supports 44A and 44B are rigidly attached to the cross member 42, for example, by welding or the like. Stiffening webs 46A and 46B strengthen the connection between the pin supports and the cross member. The pulley frame 40 includes a first threaded hole 41A and a second threaded hole 41B.

The second boom 18 includes a first side plate 50A and second side plate 50B. A cross member 52 is rigidly attached to the side plates 50A and 50B, for example by welding. A u-shaped gusset 53 is also attached to a first and second side plates and the cross member to strengthen the connection there between. Cross member 52 has a first receiving hole 54A and a second receiving hole 54B. In this case, holes 54A and 54B are plain unthreaded holes.

The pulley assembly 20, further includes a first adjustment rod in the form of a bolt 60A and second adjustment rod in the form of a bolt 60B.

Bolt 60A includes a threaded portion 61A and bolt head 62A. Bolt 60B includes a threaded portion 61B and a bolt head 62B.

As can be seen from FIG. 3, a portion of bolt 60A adjacent bolt head 62A is positioned in hole 54A. The threaded portions 61A of bolt 60A is in threaded engagement with threaded hole 41A.

Bolt 60B is similarly arranged with respect to hole 54B and threaded hole 41B.

Operation of the pulley assembly is as follows.

In use, chain 21 will stretch. As the chain stretches, then the relative positions of the first boom, second boom and third boom at a particular extension position will change (i.e. the relative positions of the first, second and third booms will no longer be synchronized). For example, with a maladjusted stretched chain, when the second boom 18 is fully extended relative to the first boom 17, then the third boom 19 will not be fully extended relative to the second boom 18. Consequently, the reach of the telescopic boom 16 will be shorter than with a properly adjusted chain.

In order to compensate for such chain stretch then the pulley assembly 20 allows the pulley to be moved in the direction of arrow A relative to the second boom 18. Thus, tightening bolts 60A and 60B by equal amounts will draw the cross member 42 and hence pin supports 44A and 44B and hence pin 26 and hence pulley 22 in the direction of arrow A.

As the cross member 42 is drawn in the direction of arrow A then the stiffening webs 46A and 46B slide along the arms 53A and 53B of the U-shaped gusset 53 thereby preventing the cross member 42 and pulley assembly 20 lifting (when viewing FIG. 2) relative to the side plates 50A and 50B of the second boom 18.

As will be appreciated, with the pivot in a maladjusted position, the pivot is in a fixed position relative to the second boom. Equally with the pivot in an adjusted position, the pulley is in a fixed position relative to the second boom.

Once the chain has been properly adjusted the bolt heads can be locked in position to prevent subsequent loosening.

The pivot pin 26 defines a pivot axis 27 and it will be appreciated that holes 54A and 54B are positioned on one side of pivot axis 27 and holes 41A and 41B are positioned on an opposite side of pivot axis 27.

In a further embodiment the holes 54 and holes 41 could be positioned on the same side of the pivot pin axis 27.

As shown in FIG. 3, holes 54A and 54B are non-threaded holes whereas holes 41A and 41B are threaded holes. In a further embodiment holes 54A and 54B could be threaded with holes 41A and 41B not being threaded.

As shown in FIG. 3 the adjustment rod 60A and 60B are in the form of bolts, though in alternative embodiments alternative types of adjustment rod could be used, for example alternative types of threaded fasteners could be used.

The invention claimed is:

1. A boom assembly comprising:
   a boom defining a longitudinal direction, and a pulley rotatably mounted on a pivot pin,
   the pivot pin having a first end with a first outer surface and a second end with a second outer surface,
   a pulley frame having a first pin support for receiving the first outer surface, a second pin support for receiving the second outer surface, and a transverse cross member having a first hole for receiving a first adjustment rod and a second hole for receiving a second adjustment rod,
   wherein the first and second pin supports are coupled to the transverse cross member and the pivot pin such that a distance between the pivot pin and the transverse cross member measured in the longitudinal direction is fixed,
   the boom including a first receiving hole for receiving the first adjustment rod and a second receiving hole for receiving the second adjustment rod,
   the boom assembly being configured such that adjustment of the first and second adjustment rods causes movement of both the transverse cross member and the pulley along the longitudinal direction of the boom.

2. The boom assembly as defined in claim 1, in which the first hole and the second hole are defined by the transverse cross member.

3. The boom assembly as defined in claim 1, wherein the first hole is a threaded hole.

4. The boom assembly as defined in claim 3, wherein the first adjustment rod is a bolt.

5. The boom assembly as defined in claim 4 wherein a threaded portion of the first bolt threadably engages the first threaded hole.

6. The boom assembly as defined in claim 4 wherein the first receiving hole of the boom is an unthreaded hole.

7. The boom assembly as defined in claim 6, wherein the unthreaded hole receives a portion of the first bolt adjacent a head of the first bolt.

8. The boom assembly as defined in claim 6, wherein the second receiving hole of the boom is an unthreaded hole.

9. The boom assembly as defined in claim 8, wherein the first receiving hole of the boom receives a portion of the first bolt adjacent a head of the first bolt and the second receiving hole of the boom receives a portion of the second bolt adjacent a head of the second bolt.

10. The boom assembly as defined in claim 4, wherein the second adjustment rod is a bolt.

11. The boom assembly as defined in claim 10, wherein the first hole of the transverse cross member is a threaded hole and the second hole of the transverse cross member is a threaded hole, wherein a threaded portion of the first bolt threadably engages the first receiving hole of the boom and a threaded portion of the second bolt threadably engages the second receiving hole of the boom.

12. The boom assembly as defined in claim 3, wherein second hole is a threaded hole.

13. The boom assembly as defined in claim 1, wherein the pin defines a pivot axis and wherein the first and second holes of the transverse cross member are positioned on a first side of the pivot axis, and further wherein the first and second receiving holes of the boom are positioned on a second side of the pivot axis opposite the first side.

14. The boom assembly as defined in claim 1, wherein the pin defines a pivot axis and wherein the first and second holes of the transverse cross member are positioned on a first side of the pivot axis and the first and second receiving holes of the boom are positioned on the first side of the pivot axis.

15. A telescopic boom arrangement including a boom assembly as defined in claim 1 wherein the boom of the boom assembly includes a second boom,
   the telescopic boom arrangement including a first boom moveable in the longitudinal direction relative to the second boom, and
   a third boom moveable in the longitudinal direction relative to the second boom, and
   a flexible tension member fixed at one end to the first boom and fixed at another end to the third boom, the flexible tension member engaging and at least partially wrapping around the pulley such that movement of the pulley relative to the first boom causes movement of the third boom relative to the pulley.

\* \* \* \* \*

UNITED STATES PATENT AND TRADEMARK OFFICE
CERTIFICATE OF CORRECTION

PATENT NO. : 10,556,781 B2  
APPLICATION NO. : 15/698480  
DATED : February 11, 2020  
INVENTOR(S) : Andrew Mark Jones It is certified that error appears in the above-identified patent and that said Letters Patent is hereby corrected as shown below:

In the Claims

At Column 4, Line 40, "threadably engages the first receiving hole of the boom" should be – threadably engages the first hole of the transverse cross member –.

At Column 4, Lines 41–42, "threadably engages the second receiving hole of the boom." should be – threadably engages the second hole of the transverse cross member. –.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*